Dec. 14, 1926.  
E. H. WAUGH  
1,610,833  
FISH BEHEADING MECHANISM  
Filed March 18, 1926  
3 Sheets-Sheet 3

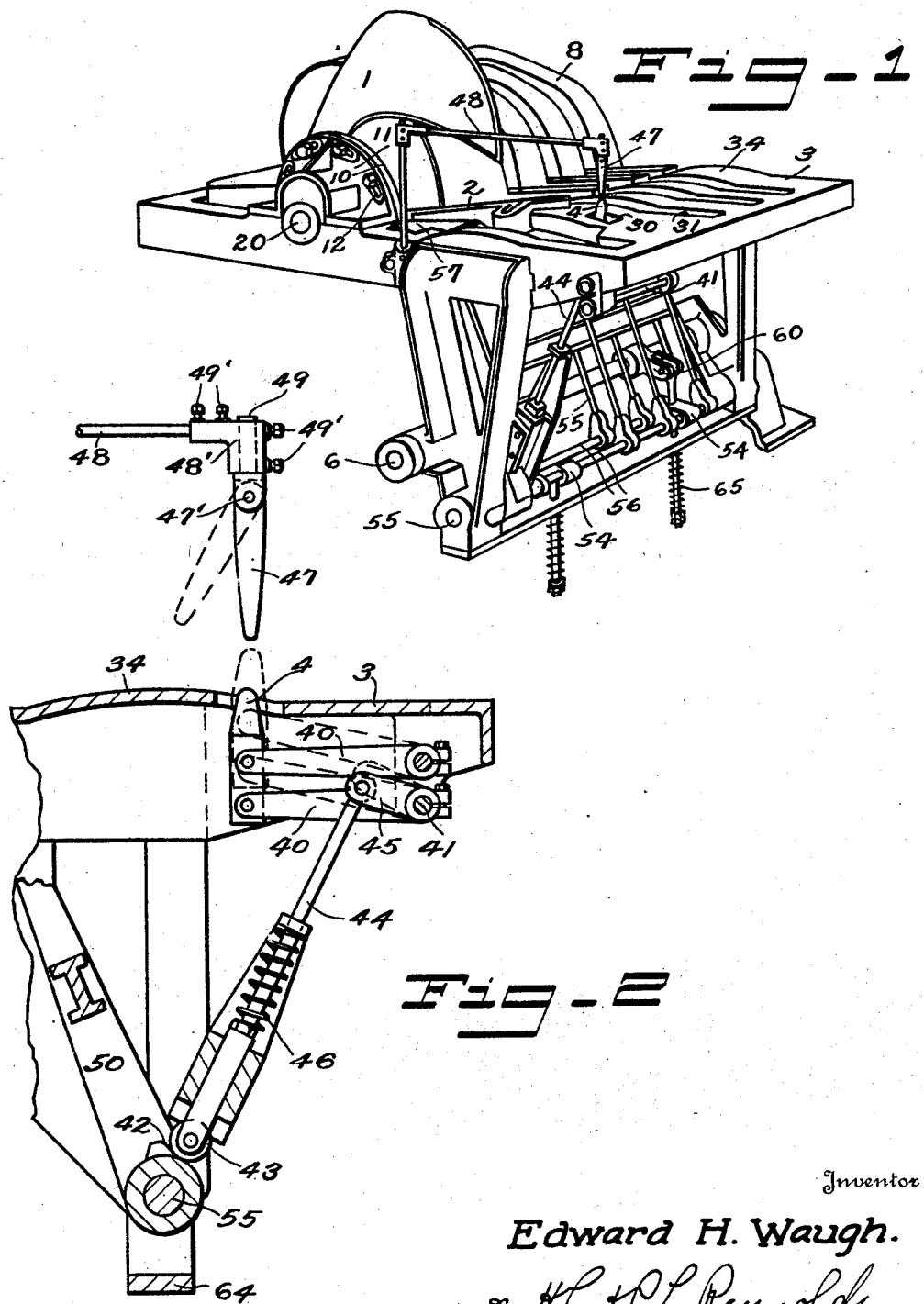

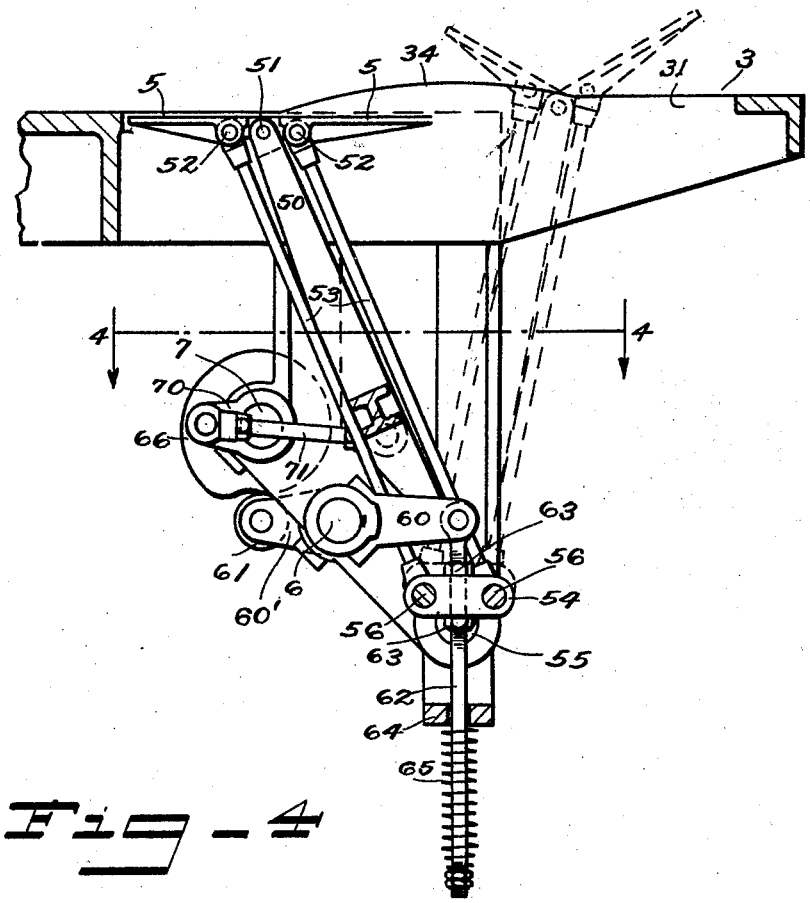

Inventor  
Edward H. Waugh.  
By H.L. & C.L. Reynolds.  
Attorneys

Patented Dec. 14, 1926.

1,610,833

UNITED STATES PATENT OFFICE.

EDWARD H. WAUGH, OF SEATTLE, WASHINGTON, ASSIGNOR TO SMITH CANNERY MACHINES CO., OF SEATTLE, WASHINGTON, A CORPORATION OF WASHINGTON.

FISH-BEHEADING MECHANISM.

Application filed March 18, 1926. Serial No. 95,573.

The present invention relates generically to fish dressing or cleaning machines and specifically to the mechanism employed in beheading the fish and to the feeding and presenting means employed, to accurately present the fish to the beheading means.

The object of my present invention is to provide means for performing the above named operations which will facilitate and make easy such work and also more accurately perform the work, thereby contributing to the saving of a small amount of the edible portions of the fish and at the same time speed up the work.

My present invention consists in the perfection of the means by which the fish may be easily and more accurately positioned on the feeding means and be thereby presented to the beheading means so that the latter will not waste edible parts of the fish. It also consists of more perfectly acting beheading means.

In the accompanying drawings I have illustrated my invention in the form which I have employed for carrying it out.

Figure 1 shows that part of a fish dressing machine which includes my present invention.

Figure 2, is a vertical section illustrative of one part of the fish positioning means.

Figure 3 is a vertical section illustrative of the means for accurate transverse positioning of the fish and for transferring them to the beheading mechanism.

Figure 4 is a sectional plan showing certain of the operating mechanism for the fish positioning and transferring mechanisms.

My invention as illustrated in the accompanying drawing has been designed for use with the machine shown in the United States patent upon a fish dressing machine issued to me June 16, 1925, No. 1,542,196. Its principles may be applied to other machines of analogous types, or may even be used independent of the parts acting upon the fish after beheading. The parts herein illustrated and described are designed to be substituted for the fish feeding and beheading means of said patent.

In said patent the beheading mechanism employed an oscillating or rocking knife and a cooperating stationary member to which the fish were presented by a feed chain having positioning blades thereon. In my present invention the beheading knife 1 is fixedly mounted or stationary while the complemental or cooperative member consists of an arm pivoted to turn upon an axis which is concentric with the axis employed in determining the transverse outline of the knife blade.

Figure 5:
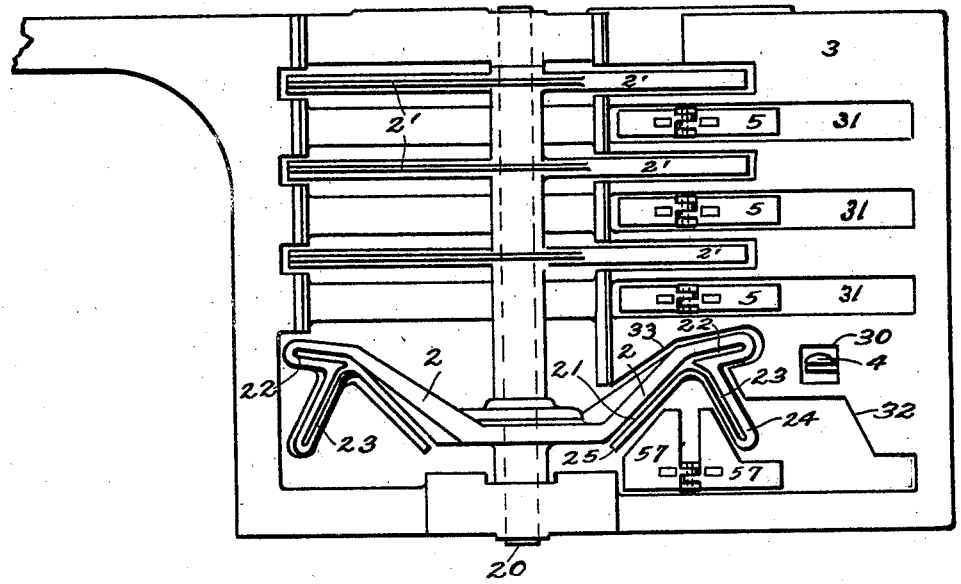
Figure 5 is a plan view of the fish receiving and feeding table and one part of the beheading means.
Figure 6:
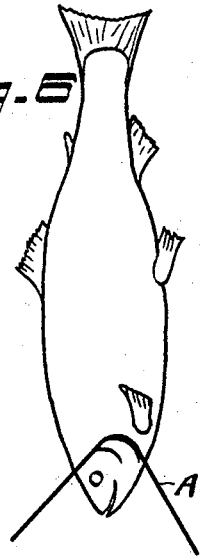
Figures 6 and 7 show the outlines of a fish and indicate two differing cuts which may be optionally employed in beheading the fish.
Figure 7:
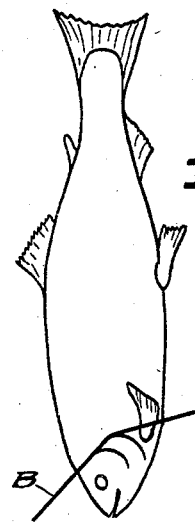

The blade of the knife, as it would be shown in outline by a section on a transverse radial plane, curves to conform to the curve of the cut desired to make on the fish when beheading it. Such cuts are made as close to the gills as feasible. In Figure 6, the line A illustrates a cut which follows closely the rear edge of the gills, the wings of the cut being bent forwardly so as to make roughly a V outline. In Figure 7, the line B shows a cut which is often preferred. While this latter cut does not save quite as much of the fish as the other, it cuts the throat connection of the intestines at a point which facilitates cleaning and saves labor as compared with the other cut.

The knife blade 1 has a segmental central section 10 which is bolted to a flange 11 mounted on the frame concentric with the shaft 20 to which is secured the complemental cutting member, bar 2. I provide slots 12 for the securing bolts so that the cutting blade may be angularly adjusted. Adjustment of this sort is often of advantage where fish are at one time larger or plumper than at other times. To reliably secure accurate cutting it is not only necessary that the fish be accurately delivered to the cutting members, but also that they remain in this position until the knife engages the fish. With a revolving arm, such as arm 2, raising the fish to a fixed knife, there would be danger of the fish sliding towards the pivot axis before engaging the knife, if the knife were positioned any material distance above the fish as it lies on the table. To insure close relation between the point of the knife and the fish before the fish is raised by arm 2, the knife is made slightly adjustable in angular position.

The revolving arms 2 are of a peculiar shape and are slotted for the passage of the blade of the knife. The slots in these arms are shaped to accommodate knives shaped to form the cut "A" and "B". Both of these shapes have a common section 21. The section 22 is used only with the knife which makes the cut "B" while the section 23 is used only with the knife which makes the cut "A". By providing the arms 2 with slots representing both forms of cuts, changing the knife and the type of cut made, does not necessitate changing the arms 2.

The knife receiving slots 21, 22, and 23 of arm 2 are designed to be a rather close fit for the knife blade. The sections 24 and 25, at the outer sides of the slots, are secured to the main body of the arm only at the outer end of the arm, leaving the slot open at its inner end, whereby it may clear the support of the knife, and complete rotation of the arms is possible.

The fish are placed upon the feed table 3 with their heads at the side corresponding with the location of the knife 1. To insure accurate positioning of the fish when presented to the knife, means are provided for exact positioning of the fish upon the table. Three positioning means are employed, two for lengthwise positioning and one chiefly for transverse positioning.

One lengthwise positioning means consists of a pin 4 mounted upon suitable operating members to be alternately raised and lowered through a hole 30 in the table. Various means for mounting and handling this pin may be employed. That illustrated pivots the pin upon the swinging ends of vertically swinging parallel arms 40. The pivot of one of these arms is a shaft 41. The means shown for actuating these arms consists of a cam 42 carried by the oscillating frame 50, and acting through roller 43 on push rod 44, which is pivoted to crank arm 45, secured on shaft 41. A spring, as 46, returns the arms 40 and pin 4 to its retracted position. The above is only the chosen one of many forms of operating means which might be used.

Another positional means, which is more in the nature of a gauge, for placing the fish upon the pin 4, consists of a pin 47 which is supported above the fish from an overhead arm 48, the latter being supported from any suitable part of the frame. Finger 47 is pivoted at 47' upon a rod 49 mounted for vertical adjustment in a block 48', which block is also adjustable upon the arm 48, set screws 49' being used to secure the parts in adjusted position. The pin 47 being pivoted upon the rod 49, may swing with the fish and is automatically returned to its standard normal position by gravity or by a spring acting thereon. This gauge pin greatly facilitates accurate placing of the fish as it points out the position of the lower pin 4.

The means for transversely positioning the fish have been combined with the carrier which presents the fish to the knife. This mechanism employs a series of arms 5 located in slots 31 in the feed table. These arms form pairs and are pivoted to each other and to oscillating arms or frame 50 on the axis 51. The oscillating frame 50 is pivoted at 55.

Pivoted to the transverse centering and carrier arms 5, at 52, are rods 53 which, at their lower ends, are pivoted to a block or blocks 54, or to cross bars 56 carried by the blocks 54. Means are provided to secure vertical movement of the bars 56 at suitable intervals, thereby to oscillate the fish carrier arms 5 between the positions shown respectively in full and in dotted lines in Figure 3. The timing of such mechanism produces the trough-like conditions such as are shown by dotted lines in Figure 3, when the carrier arms 5 are in the position of first reception of the fish. This inclination of the arms towards their pivot axis secures exact transverse positioning of the fish.

The control in position of arms 5 is by the moving of the rods 56 vertically. A rod 62 is carried by one end of a lever 60 pivoted at 6 and carrying a cam roller 61 engaged and operated by a cam 66 secured on a rotative shaft 7. Rod 62 passes through block 54 and the point of connection is adjustably secured by nuts 63. Rod 62 is also guided by bar 64 through which it passes. Spring 65 returns rod 62 to its lowered position. When cam 66 acts upon lever 60, the carrying arms are raised to their inclined position. The arms 50 and the carrying arms 5 are swung back and forth to present the fish to the knife by a crank 70 and link 71, which is pivoted upon, or connected with, the arms 50.

The outermost set of carrier arms 57 are made wider in part than the others and to substantially fill the angle between the sections 21 and 24 of the revolving arms 2.

The operation of the device is as follows:
At the time of placing of the fish upon the table 3, the pin 4 is raised. The fish is placed with his gills over this pin, thereby accurately positioning it lengthwise. At this time, or immediately thereafter, the carrier arms 5 are in the inclined position, as shown by the dotted lines in Figure 3. These arms are then swung towards the beheading position where the fish is engaged by the revolving arms 2, raised against the fixed knife 1 which makes the cut close to and rearwardly of the gills. The fish body then drops into the trough through which it is passed to the cleaning mechanism. Guide bars 8 support the fish while being carried over by the arms 2. Arms 2' secured upon the same shaft as arms 2, function solely as carrying and transferring arms, while arm 2 functions similarly and also as a complemental cutting member.

What I claim as my invention is:

1. In a fish beheading machine, the combination with a knife and members cooperating therewith to behead the fish, of a fish presenting means comprising a troughlike fish transferring carrier, and means for moving said carrier between the receiving and beheading positions.

2. A fish positioning mechanism for fish beheading machines, comprising fish carrying members hinged together to form a trough-like carrier, means for bodily moving said members together to transfer the fish to the beheading position, and means for swinging said carrying members upon their pivot to discharge the fish.

3. A fish positioning mechanism for fish beheading machines, comprising a frame mounted for lateral movement, a series of fingers pivoted on the frame for swinging between flat and inclined positions, and means for operating said fingers to at one time form of them a trough-like carrier and to then flatten them.

4. The combination with a fish beheading knife and a complemental fish supporting frame of a reciprocating fish carrier having pivoted members movable to form a fish positioning trough.

5. A fish positioning device for fish beheading apparatus comprising a reciprocable frame, a series of laterally and oppositely extending arms pivoted upon said frame, means for laterally reciprocating said frame and means for swinging said arms into a trough outline and into alignment with each other.

6. A fish positioning device for fish beheading apparatus, comprising a frame mounted to swing upon carrying arms, fish carrying arms pivoted to and extending oppositely from said frame, controlling rods extending from said arms to adjacent the pivot axis of said frame, and means for operating said rods during portions of the arc of swing of the frame, to thereby position the fish carrying arms to form a trough-like outline.

7. In a fish dressing machine, the combination with the beheading knife and its complemental fish supporting members, of a feed table having slots therein extending in the direction of feed, fish carrying arms reciprocable in said slots and means for reciprocating said carrying arms to thereby present the fish to the knife.

8. In a fish dressing machine, a means for accurately positioning a fish, comprising a projection adapted to enter the fish's gills and oppositely extending arms pivoted to be swung into a trough-like outline to thereby position the fish laterally.

9. In a fish dressing machine, a fish-receiving and feeding table, a positioning finger movable to be projected above and retracted below said table surface and adapted to enter the fish gills, and members tiltable to form a trough and adapted to engage the fish while on said pin to laterally position the fish.

10. In a fish dressing machine, a fish receiving and feeding table, a fish positioning finger adapted to enter the gills of the fish to thereby accurately position the fish lengthwise, said finger being movable to release the fish for further feeding, and movable members engageable with the sides of the fish to transversely position the fish.

11. In a fish dressing machine, a receiving and feeding table having slots extending in the direction of feed of the fish, a fish feeding and positioning mechanism comprising a frame carrying arms pivoted to said frame and extending lengthwise in said table slots, means for moving said frame and its arms lengthwise of the slots, and means for swinging said arms upon said frame to form a fish positioning trough.

12. A beheading mechanism for a fish dressing machine comprising a fixed knife and a complemental fish supporting member mounted to revolve past the knife, and means for angularly adjusting the knife relative to its complemental fish supporting member.

13. A fish beheading device comprising a feed table, two complemental cutting members, one fixed and the other rotative and means for the angular adjustment of the fixed member.

14. A fish beheading device comprising a feed table, two complemental cutting members, one fixed and the other rotative, the axis of said rotation being substantially in the table surface, and means for adjusting the fixed member toward and from the table surface.

15. A fish beheading device comprising a feed table, a shaft journaled at the delivery side of the table, a fixed knife having cutting edges positioned with relation to the axis of said shaft and adjustable angularly to vary the spacing of its point above the table, and a revolving arm forming a complemental cutting member having a cutting edge conforming in outline with the curved outline of the cutting edge of the knife.

16. In a fish beheading mechanism, a fish positioning means adapted to enter the fish gills, and a fish feeding means independent of said positioning means.

17. In a fish feeding device, a feed table, a fish positioning pin adapted to be projected above said table and yieldable to permit forward feeding movement in the fish, and a fish feeding mechanism.

18. In a fish feeding device, a feed table having an opening accommodating a positioning pin, a fish positioning pin normally projectible through said opening and above the table surface, means for raising and lowering said pin, and a forward feeding mechanism for the fish.

19. In a fish feeding device, a feed table, a positioning pin and mechanism for intermittently projecting said pin above the table surface, positioning arms movable to engage the sides of the fish to position it transversely, and means operable to advance the fish for the next succeeding step.

20. A fish positioning device for fish dressing machines comprising a fish receiving table, a pair of links pivoted beneath and extending substantially parallel with the table surface, a positioning pin pivoted to the swinging ends of both of said links, and means for vertically swinging said links to thereby project the pin above and withdraw it below the table surface.

21. A fish positioning device for fish dressing machines comprising a fish receiving table having a hole therein, a pair of links pivoted in parallel relation beneath said table, a vertically extending bar pivoted to the swinging ends of both of said parallel links, and having its upper end positioned to be projected through said hole in the table, and means for raising said pin at intervals.

22. In a fish dressing machine, in combination, a beheading mechanism and means for operating it, means for automatically presenting the fish to the beheading mechanism, and a fish positioning device comprising a pin and means for reciprocating it to project it above the fish receiving surface of the fish presenting means, and operating means for said mechanisms actuated from a common source.

23. A fish beheading mechanism comprising a rotative arm and a fixed knife, said knife having its cutting edge brought to a point intermediate of its length and bent to outline the cut desired upon the fish for all radial planes thereof, said knife being mounted concentric with the rotative axis of the arm, the arm being provided with a slot open at the end which is towards the rotative axis of the arm, and having an outline conforming to the radial outline of the knife.

24. In a fish beheading machine the combination with a knife having a blade transversely conforming in outline with a surface of revolution, and a complemental cutting member having a slot conforming to the same outline as the blade of the knife, said blade and complemental member being given a relative rotative movement about a common axis.

25. In a fish beheading device a knife blade and a complemental cutting member having a slot which branches in its outer part, said branch sections each conforming to the outline of its respective one of differing shaped blades.

26. In a fish beheading device a beheading knife adapted for cutting by a rotative movement, the cutting blade extending radially from the rotative axis and being bent to conform to the path of rotation of the desired cut about the rotative axis, said blade having converging cutting edges forming a point located approximately towards the middle of its radial width.

27. In a fish feeding means, a receiving table, fish receiving carriers movable to transfer the fish on said table, and fish positioning means comprising a vertical pin, two parallel bars pivoted by one end to said pins and by their other end to a frame member, and means for periodically swinging said bars to project said pin above and withdraw it below the table surface.

28. A fish positioning device comprising two pivotally mounted bars, a fish positioning pin pivoted to the swinging ends of said swinging bars, and means for raising and lowering said pin.

29. A fish positioning device comprising a fish receiving surface, a positioning pin mounted to swing in a vertical arc to project its end above and to withdraw it below said receiving surface.

30. The combination with the fish feeding mechanism of fish dressing machines, of a gauge pin supported over and positioned to indicate the exact desired position of a given point of the fish.

31. In a fish feeding mechanism, a positioning pin designed to enter the gills of the fish, and a gauge pin supported from above the fish to indicate the position of the positioning pin.

32. In a fish feeding mechanism, a positioning pin designed to enter the gills of the fish, and a gauge pin supported from above the fish to indicate the position of the positioning pin, said gauge pin being hinged to permit its lower end to swing with the feeding movement of the fish.

Signed at Seattle, Washington, this 8th day of March, 1926.

EDWARD H. WAUGH.